(12) United States Patent
Morein (10) Patent No.: US 10,074,203 B2
(45) Date of Patent: Sep. 11, 2018

(54) OVERLAY FOR DISPLAY SELF REFRESH

(71) Applicant: Synaptics Incorporated, San Jose, CA (US)

(72) Inventor: Stephen L. Morein, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 220 days.

(21) Appl. No.: 14/581,704

(22) Filed: Dec. 23, 2014

(65) Prior Publication Data

US 2016/0180796 A1 Jun. 23, 2016

(51) Int. Cl.
*G06T 11/60* (2006.01)
*G09G 5/395* (2006.01)
*G09G 5/00* (2006.01)
*G06F 3/14* (2006.01)

(52) U.S. Cl.
CPC ............. *G06T 11/60* (2013.01); *G09G 5/003* (2013.01); *G09G 5/395* (2013.01); *G06F 3/1415* (2013.01); *G09G 5/006* (2013.01); *G09G 2320/103* (2013.01); *G09G 2330/021* (2013.01); *G09G 2340/02* (2013.01); *G09G 2340/12* (2013.01); *G09G 2360/18* (2013.01)

(58) Field of Classification Search
None
See application file for complete search history.

(56) References Cited

U.S. PATENT DOCUMENTS

| 6,971,034 | B2 | 11/2005 | Samson et al. | |
|---|---|---|---|---|
| 7,034,791 | B1* | 4/2006 | Odom | G09G 5/14 345/100 |
| 8,207,977 | B1 | 6/2012 | Kumar et al. | |
| 8,274,501 | B2 | 9/2012 | Kwa et al. | |
| 8,619,085 | B2 | 12/2013 | Keall et al. | |
| 8,643,658 | B2 | 2/2014 | Kwa et al. | |
| 9,524,008 | B1* | 12/2016 | Woodall | G06F 1/3265 |
| 2002/0196243 | A1* | 12/2002 | Morita | G09G 3/3611 345/204 |
| 2004/0001071 | A1* | 1/2004 | Noyle | G06T 15/503 345/589 |
| 2006/0146056 | A1 | 7/2006 | Wyatt | |
| 2007/0124474 | A1* | 5/2007 | Margulis | G06F 3/14 709/226 |
| 2007/0222774 | A1* | 9/2007 | Foster | G06F 3/1431 345/204 |
| 2009/0189892 | A1* | 7/2009 | Desai | G06F 9/505 345/419 |
| 2010/0321402 | A1* | 12/2010 | Han | G06F 3/1415 345/619 |
| 2011/0169847 | A1* | 7/2011 | Bratt | G06F 3/14 345/545 |
| 2012/0075188 | A1 | 3/2012 | Kwa et al. | |
| 2012/0127193 | A1* | 5/2012 | Bratt | G09G 5/022 345/590 |

(Continued)

*Primary Examiner* — Michael J Cobb
(74) *Attorney, Agent, or Firm* — Patterson + Sheridan, LLP (57) ABSTRACT

A display device, a processing system, and a method are provided for updating a display device using self-refresh techniques. The described system is configured to overlay dynamic data from a source over a static image in the display device. Components of the described system may include the overlay for non-static image data, compression of the overlay, and dirty region tracking for the source display engine.

16 Claims, 3 Drawing Sheets

(56) References Cited

U.S. PATENT DOCUMENTS

| | | | |
|---|---|---|---|
| 2012/0133659 A1* | 5/2012 | Masnikosa | G06T 15/005 345/520 |
| 2012/0249559 A1* | 10/2012 | Khodorkovsky | G06F 1/3203 345/502 |
| 2012/0249563 A1* | 10/2012 | Wyatt | G06F 3/14 345/522 |
| 2014/0092112 A1* | 4/2014 | Solomon | G06F 1/3203 345/545 |
| 2014/0184611 A1* | 7/2014 | Wyatt | G09G 3/36 345/501 |
| 2014/0184629 A1* | 7/2014 | Wyatt | G09G 5/393 345/547 |
| 2014/0218378 A1* | 8/2014 | Roh | G06T 1/60 345/519 |
| 2014/0233629 A1* | 8/2014 | Lipman | H04N 19/436 375/240.01 |
| 2014/0267329 A1* | 9/2014 | Lee | G06T 1/20 345/522 |
| 2016/0275900 A1* | 9/2016 | Kwa | G09G 3/20 |

* cited by examiner

OVERLAY FOR DISPLAY SELF REFRESH

FIELD OF THE INVENTION

This invention generally relates to updating a display device.

BACKGROUND OF THE INVENTION

Display devices for updating images on a display screen are widely used in a variety of electronic systems. A typical display device includes a source that provides display data that is used to update the screen. The display data may be organized into display frames which are transmitted from the source to the display screen at a predefined rate. In one example, each display frame corresponds to an image to be displayed on the screen. The display screen may include display drivers that update the individual pixels on the display screen using the received display frames. The pixels in the display screen are typically assigned to one of the source drivers—e.g., the pixels in columns 1-5 are assigned to Source Driver 1, the pixels in columns 6-10 are assigned to Source Driver 2, and so forth.

BRIEF SUMMARY OF THE INVENTION

Embodiments described herein include a processing system for a display. The processing system includes a display memory configured to store a first frame of display update data, and a display driver module. The display driver module is configured to operate in a self-refresh mode comprising updating a display using the first frame of display update data stored in the display memory. The display driver module is further configured to operate in a second mode include receiving, from a source, an overlay of display update data, merging the overlay with the stored first frame of display update data to form a merged image, and updating a display using the merged image.

Another described embodiments provides a method for operating a display device. The method includes storing a first frame of display update data in a display memory, and receiving an overlay of display update data from a source. The method further includes merging the overlay with the stored first frame of display update data to form a merged image, and updating a display using the merged image.

Embodiments described herein further include a display device, including a source configured to generate an overlay of display update data, and a processing system coupled to the source. The processing system includes a display memory configured to store a first frame of display update data, and a display driver module configured to operate in a self-refresh mode. The self-refresh mode includes updating a display using the first frame of display update data stored in the display memory. The display driver module is further configured to operate in a second mode including merging the overlay with the first frame of display update data to form a merged image, and updating a display using the merged image.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide display devices and methods that facilitate improved output display. Various embodiments of the present invention provide display devices and methods for updating a display. Display interfaces have been proposed to extend a self-refresh mode with a "partial update" functionality to allow for power savings even when a portion of the display image changes. However, implementing partial-update functionality has many challenges: it imposes constraints on compression that reduce the quality of compression, power can increase due to the need to read and write from the display's frame buffer 116, and often fails to realize that the common case involving a continuously changing portion of the display image. Accordingly, embodiments of the present disclosure are configured to overlay dynamic data from a host processor over a static image in the display device. In one embodiment, components of the described system may include the overlay for non-static image data, compression of the overlay, and dirty region tracking for the source display engine.

Figure 1A:
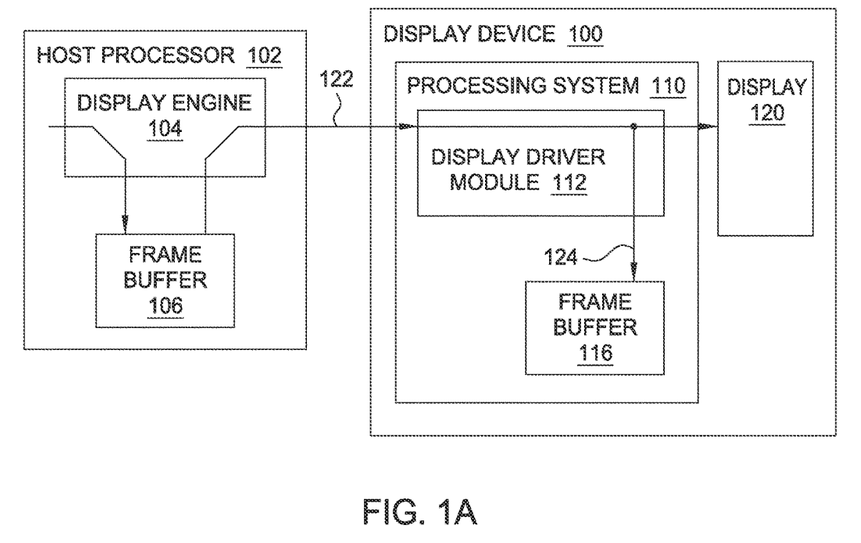
FIGS. 1A-1C are block diagrams of an exemplary system that includes an input device in accordance with an embodiment of the invention.
Figure 1B:
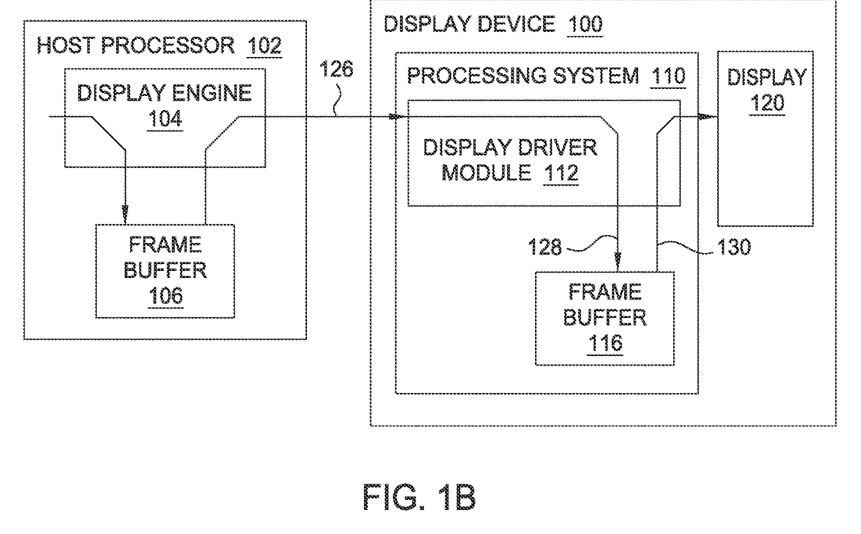

Turning now to the figures, FIGS. 1A and 1B are block diagrams of an exemplary display device 100, in accordance with embodiments of the invention. The display device 100 may be configured to display output from a host processor 102 of an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the display device 100.

The display device 100 can be implemented as a physical part of the electronic system, or can be physically separate from the electronic system. As appropriate, the display device 100 may communicate with parts of the electronic system using any one or more of the following: buses, networks, and other wired or wireless interconnections.

Examples include I²C, SPI, PS/2, Display Port, Universal Serial Bus (USB), Bluetooth, RF, and IRDA.

The display device 100 includes a processing system 110 and a display 120. The processing system 110 may be a timing controller, display controller, and the like. The processing system 110 may be part of an integrated circuit or system on a chip (SoC). Moreover, the processing system 110 may be disposed on the same substrate as the host processor 102 (e.g., mounted on the same PCB) or mounted on different substrates. The display 120 may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology.

In one embodiment, the processing system 110 of the display device 100 is communicatively coupled to the host processor 102 via a display interface, and the host processor 102 acts as a display source for the display device 100. The host processor 102 includes a display engine 104 and a frame buffer 106. The display engine 104 may be a graphics processing unit, a separate or integrated electronic system, and the like. The display engine 104 is configured to transmit frames of display update data to the processing system 110. The frame buffer 106 comprises system memory having a size sufficient to store one or more frames of display update data.

The processing system 110 includes a display driver module 112 and a frame buffer 116. The display driver module 112 includes circuitry configured to provide display image update information to the display 120 of the display device 100 during display updating periods. The display driver module 112 may be included in or be separate from the processing system 110. In one embodiment, the processing system 110 comprises a first integrated controller comprising the display driver module 112 and the frame buffer 116. In another embodiment, the processing system 110 comprises a first integrated controller comprising the display driver module 112 and a second integrated controller comprising the frame buffer 116.

In one embodiment, the processing system 110 may be configured to operate in a first mode, referred to as a "video mode" or "display port mode," in the processing system 110 constantly refreshes the display 120 using display frames 122 provided by the host processor 102. Example operations in video mode are depicted in FIG. 1A. The frame buffer 106 of the host processor (display source) is read, and the display update data (image data) is sent to the display device 100, where the image data is displayed on the display 120. Optionally, the display image may also be copied to the frame buffer 116 of the display device 100 (depicted as line 124). In some implementations, the host processor 102 may suspect there is an opportunity for self-refresh and instructs the processing system 110 to save the display image during a "save mode" of operation. It is noted that if the display image is in fact static, additional power is consumed by the need to re-send the display over the display interface. In some implementations, the implementation of the display refresh in the host processor (source) is less power efficient than an implementation in the display device 100.

The processing system 110 may be further configured to operate in a second mode, referred to as a "self-refresh mode" or "command mode," in which the processing system maintains the display image on the display 120 using the local frame buffer 116 instead of from the frame buffer 106 of the host processor 102. The self-refresh mode may be used for any period of time in which the display output is a static display image, i.e., the display image has not changed from one display frame to the next. The self-refresh mode allows for a lower power consumption as the host processor 102 does not need to re-send the frame buffer data and can remain in a low power state.

It is noted that in a self-refresh mode, the display link between the host processor 102 (source) and the processing system 110 (display) becomes inactive, and the display device 100 operates in an asynchronous fashion. When the host processor 102 has new image data, the host processor 102 starts transmitting again, and may be out of sync with the processing system 110. To re-synchronize the state of the processing system 110 with the host processor 102 without losing content, it may be necessary to treat the frame buffer 116 of the display as a first-in-first-out (FIFO) buffer until the display can be synchronized. In such cases, the capability to read and write the full display bandwidth into the frame buffer 116 simultaneously may be needed. With such a capability, the frame buffer would only need the bandwidth to either read or write, but not both.

Display interfaces have been proposed extending the self-refresh mode with a "partial update" functionality to allow for power savings even when a portion of the display image changes. FIG. 1B illustrates one approach to a partial-update functionality. In the embodiment shown, the display device 100 refreshes the display 120 from the local frame buffer 116 (line 130), and commands are used to send part of a new display frame (line 126) to the display device 100. This approach is similar to self-refresh approaches that use a command to send over an entire display frame to the display which replaces the current frame within the frame buffer 116, except in this case, a part of the display frame is replaced within the frame buffer 116. One weakness to this approach is that power consumption is higher for non-static display images as display data is read (line 130) and written (line 128) to the local frame buffer 116 of the display, thereby requiring twice the bandwidth.

Implementing partial-update functionality has other challenges, for example, imposing constraints on compression that reduce the quality of compression. The style of compression algorithms that work for display compression, such as visually lossless compression algorithms, operate by compressing areas that have low entropy and using the resulting bit budget for areas with high entropy. Application of such compression to partial update functionality results in decompressing the section of the display image that is modified, then re-compressing the updated display image. However, there is no guarantee that the modified display image will compress to the same degree as the original display image, meaning the re-compressed display image cannot be placed where the original display image was. Some approaches require the source display image be compressed in blocks with a fixed bit budget. However, this reduces compression quality, and means that only whole blocks can be updated, which can increase bandwidth and power consumption for small updates. For example, a 16×16 pixel cursor update may result in having to update sixteen 1 pixel high by 480 pixel wide blocks.

Known approaches for implementing partial-update functionality also sometimes fail to realize that a common case involving a continuously changing portion of the display image. For display activity such as scrolling a window, animation in a window or a section of a window, or a cursor, the partial display updates are not static updates, but the display data is nonetheless updated again on a next frame. In cases where the display activity does indeed involve a static image, such as, typing in a window, the area of the display image that is updated is small. In many other cases, such as loading new data into a window, the power consumption difference between updating half the screen, and then being fully static for 5 seconds (300 frames), and updating the full display image, and then static again, is insignificant.

Accordingly, embodiments of the present disclosure provide a system and technique for partially updating a display. In the embodiment shown in FIG. 1C, the processing system 110 is configured to operate in a self-refresh mode of operation in which an overlay (possibly containing the image content) is sent over the display interface between the host processor 102 and the processing system 110. The described system is configured to overlay dynamic data from the host processor 102 over a static image in the display device 100. In one embodiment, components of the described system may include the overlay for non-static image data, compression of the overlay, and dirty region tracking for the source display engine 104.

Figure 1C:
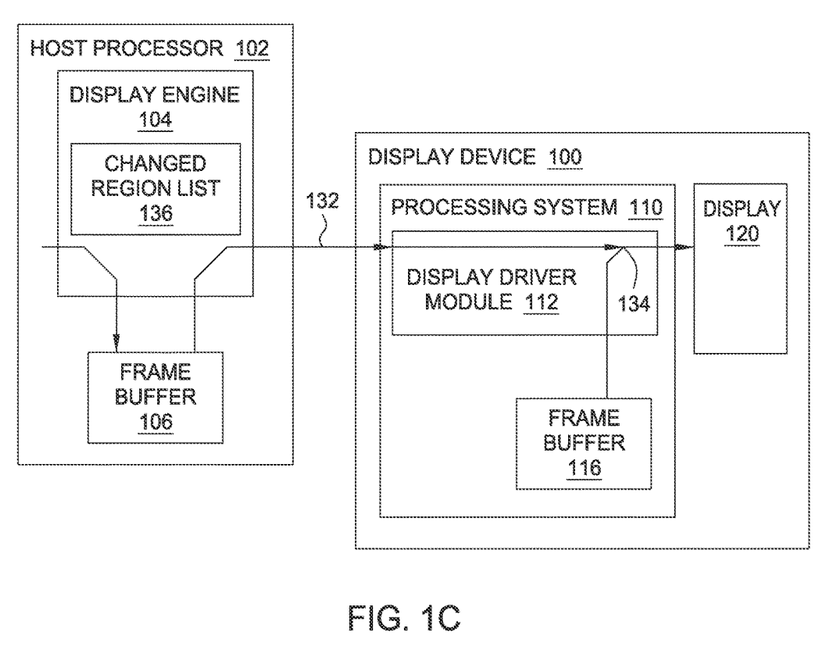

In one embodiment, the display engine 104 of the host processor 102 is configured to generate an overlay 132 containing changes, if any, to a display image. The overlay 132 may comprise display update data representing changes compared to a display image sent in a prior display frame and one or more "transparent" pixels representing unchanged portions of the display image. In one implementation, a transparent pixel may include a pixel address (e.g., X and Y coordinates) of the display and an indication that the corresponding pixel address has no changes in comparison from the prior display frame stored in the local frame buffer 116. In another implementation, the transparent pixel may be a reserved value at a position within a data structure indicating that the pixel corresponding to the position in the data structure is unchanged from the prior display frame. In some cases, there may be no changes to the display image compared to the prior display frame, in which case the overlay is comprised entirely of transparent pixels. In other cases, there may be small amount of changes to the display image compared to the prior display frame, in which case the overlay is comprised mostly of transparent pixels and a small amount of display update data.

The display engine 104 may include a compression module (not shown) configured to compress the overlay 132 prior to providing the overlay to the display device 100. While the compression algorithm may be based on any of known compression techniques, including visually lossless compression techniques such as the Display Stream Compression (DSC) standard, the compression algorithm is extended to support compression of transparent pixels within the overlay 132. Since, in many cases, an overlay 132 may be comprised mostly of transparent pixels, the overlay 132 may be compressed to a high degree using run length encoding (i.e., sequences in which a same data value occurs in many consecutive data elements are stored as a single data value and count, rather than as the original sequence) and other similar compression techniques. In fact, in cases where there is no changes, the overlay 132 comprised entirely of transparent pixels may compress to not much more than sync signals for the processing system 110.

In some implementations, the display engine 104 of the host processor 102 may be constrained in how the display engine 104 is permitted to read from the frame buffer 106. The frame buffer 106 may be tiled in a complex pattern to optimize memory efficiency. The tiling may vary from one host processor to another, and even vary on a single chip depending on the installed memory configuration or even the color format used. As a result, existing implementations of partial-update functionality burden the display source with the need to align compressed blocks to agreed-upon block (slice) sizes. In contrast, by implementing partial update functionality using an overlay mechanism as described herein, embodiments of the present disclosure allow the display source (i.e., host processor 102) to be in control of the granularity of chunks of pixels sent to the display.

In one embodiment, the display engine 104 of the host processor 102 is configured to maintain a list 136 of changed regions of the display image. When the display engine 104 detects an update to its local frame buffer 106, the display engine 104 determines whether the update should be added to the list 136 of changed regions, or, alternatively, whether the display engine 104 should expand one of the regions that have already been allocated. When the list 136 of changed regions becomes too full, or appears to cover too large an area of the display (i.e., has an area that exceeds a threshold size), the display engine 104 may clear the list 136 of changed regions, and force a full frame update.

When the display engine 104 refreshes the display device 100, the display engine 104 examines the list 136 of changed regions and fetches image data from the frame buffer 106 for only those changed regions. In some implementations, the fetched regions may be expanded to align with a tiling-defined fetch size of the frame buffer 106. The display update data fetched from the frame buffer 106 is used to generate an overlay as described above.

Figure 2:
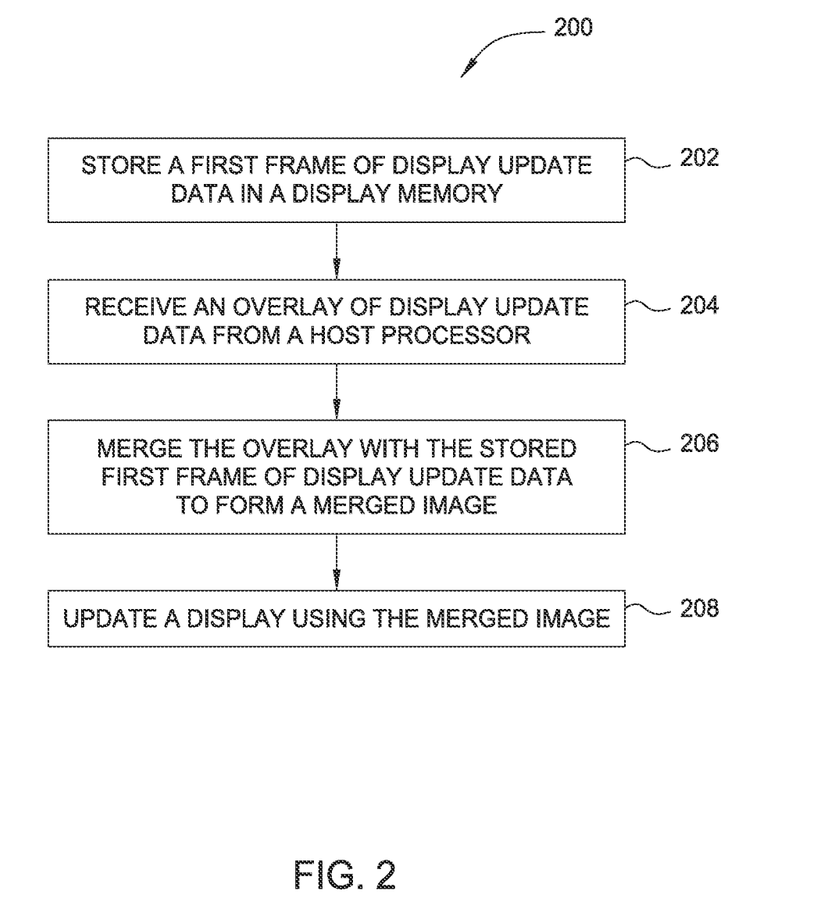
FIG. 2 is a flow diagram of a method for updating a display device, according to one embodiment of the present disclosure.

FIG. 2 is a flow diagram of a method 200 for updating a display device 100, according to one embodiment of the present disclosure. The method 200 begins at step 202, where the processing system 110 (e.g., by operation of the display driver module 112) receives and stores a first frame of display update data from the host processor 102. In some embodiments, the host processor 102 provides an indication to the display driver module 112 to store the first frame of display update data in the display memory.

At step 204, the processing system 110 (e.g., by operation of the display driver module 112) receives an overlay of display update data from a source, such as the host processor 102. The overlay of display update data may include a plurality of transparent pixels. In some embodiments, the overlay has been generated by the host processor 102 based on a determination that a region of display has been changed. In some embodiments, the overlay may include a first plurality of pixels corresponding to the changed region and a second plurality of pixels comprised of transparent pixels. The overlay may be compressed by the host processor 102 prior to being provided to the display driver module 112. As such, the processing system 110 de-compresses the overlay using a decompression algorithm corresponding to the compression algorithm used by the host processor 102.

At step 206, the processing system 110 (e.g., by operation of the display driver module 112) merges the overlay with the stored first frame of display update data to form a merged image 134. In some embodiments, for each pixel of display update data, the display driver module 112 uses a pixel from the stored first frame of display update data to form the merged image 134 based on a determination that a corresponding pixel of the overlay is a transparent pixel. Otherwise, for each pixel, the display driver module 112 uses a pixel from the overlay to form the merged image 134. As a result, the merged image 134 includes a first plurality of pixels form the overlay and a second plurality of pixels from the first frame of display update data stored in the frame buffer 116.

At step 208, the processing system 110 (e.g., by operation of the display driver module 112) updates the display 120 using the merged image 134. In one embodiment, the merged image 134 is not stored within the memory of the display (i.e., frame buffer 116), which reduces the amount of power consumption and bandwidth that would otherwise be required to implement partial update functionality.

In some embodiments, the host processor 102 may mark one or more regions of the display as being changed based on the generated overlay. The host processor 102 may provide a second frame of display update data to the display driver module 112 responsive to a determination that a threshold amount of regions of the display has been changed.

In one special case of display activity, the host processor 102 may be configured to support a source "video scaler." In such embodiments, since the region defined by the scaler is known to be changing if enabled, the host processor may consider that to be part of the region that needs to be updated. The rendering of a cursor is another special case of display activity to be handled by embodiments of the present disclosure. In one embodiment, the cursor may be implemented in the display by a sprite. However, if the display is scaled, the cursor bitmap may not be correct for the final display image. Accordingly, embodiments may include two special regions in the list 136 of changed regions. A first region contains the location of the cursor at the time that a first frame of display update data is stored. A second region contains the current cursor position. This configuration may be used to hide the cursor at the original location, and display it at the current position.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:

1. A processing system for a display, the processing system comprising:
 a display memory configured to store a first frame of display update data received from a source; and
 a display driver module configured to operate in a partial self-refresh mode comprising:
  receiving, from the source, in each display frame during the partial self-refresh mode, an overlay of compressed display update data, wherein the overlay of compressed display update data indicates a plurality of pixels as transparent;
  decompressing the overlay of compressed display update data;
  merging the decompressed overlay of display update data with the stored first frame of display update data to form a merged image; and
  updating the display using the merged image, wherein updating the display using the merged image comprises, for each pixel in the display, updating the pixel using the stored first frame of display update data based on an indication that a corresponding pixel in the overlay of display update data is one of the transparent pixels and updating the pixel using the overlay of display update data directly based on an indication that the corresponding pixel in the overlay of display update data is not transparent, without storing the merged image in the display memory; and
 wherein the display memory is configured to replace at least a portion of the stored first frame of display update data when a second frame of display update data is received from the source, responsive to the source determining that a plurality of regions of the display has been changed.

2. The processing system of claim 1, wherein merging the overlay of display update data with the stored first frame of display update data further comprises:
 reading the overlay of display update data from a frame buffer of the source; and
 while reading the overlay of display update data, reading the stored first frame of display update data from the display memory to form the merged image.

3. The processing system of claim 1, wherein:
 the overlay of display update data is generated based on a determination that a region of the display has been changed,
 the overlay of display update data further indicates a first plurality of pixels corresponding to the region of the display that has been changed as not transparent and a second plurality of pixels corresponding to the region of the display that has not been changed as the plurality of transparent pixels.

4. A method for operating a display device, the method comprising:
 storing a first frame of display update data received from a source in a display memory;
 receiving an overlay of compressed display update data from the source, wherein the overlay of compressed display update data indicates a plurality of pixels as transparent;
 decompressing the overlay of compressed display update data;
 merging the decompressed overlay of display update data with the stored first frame of display update data to form a merged image; and
 updating a display using the merged image, wherein updating the display using the merged image comprises, for each pixel in the display, updating the pixel using the stored first frame of display update data based on an indication that a corresponding pixel in the overlay of display update data is one of the transparent pixels and updating the pixel using the overlay of display update data directly based on an indication that the corresponding pixel in the overlay of display update data is not transparent, without storing the merged image in the display memory; and replacing at least a portion of the stored first frame of display update data when a second frame of display update data is received from the source, responsive to the source determining that a plurality of regions of the display has been changed.

5. The method of claim 4, wherein merging the overlay of display update data with the stored first frame of display update data further comprises:
reading the overlay of display update data from a frame buffer of the source; and
while reading the overlay of display update data, reading the stored first frame of display update data from the display memory to form the merged image.

6. The method of claim 4, further comprising:
generating, by operation of the source, the overlay of display update data based on a determination that a region of the display has been changed, wherein the overlay of display update data indicates a first plurality of pixels corresponding to the region of the display that has been changed as not transparent and a second plurality of pixels corresponding to the region of the display that has not been changed as the plurality of transparent pixels, and wherein the compressed overlay of display update data includes compressed display update data for one or more of the second plurality of transparent pixels.

7. A method for operating a display device, the method comprising:
storing a first frame of display update data received from a source in a display memory;
receiving an overlay of compressed display update data from the source, wherein the overlay of compressed display update data indicates a plurality of pixels as transparent;
decompressing the overlay of compressed display update data;
merging the decompressed overlay of display update date with the stored first frame of display update data to form a merged image;
updating the display using the merged image, wherein updating the display using the merged image comprises, for each pixel in the display, updating the pixel using the stored first frame of display update data based on an indication that a corresponding pixel in the overlay of display update data is one of the transparent pixels and updating the pixel using the overlay of display update data directly based on an indication that the corresponding pixel in the overlay of display update data is not transparent, without storing the merged image in the display memory;
marking, by operation of the source, one or more regions of the display as being changed;
responsive to determining that a plurality of regions of the display has been changed, providing a second frame of display update data to the display memory; and
replacing at least a portion of the stored first frame of display update data with the second frame of display update data.

8. The method of claim 7, further comprising:
maintaining a list of the one or more regions of the display marked as being changed.

9. The method of claim 8, further comprising:
adding one or more regions to the list if new display update indicates the one or more regions as changed; and expanding one or more regions in the list if the new display update indicates the expanded one or more regions as changed.

10. The method of claim 9, wherein determining that the plurality of regions of the display has been changed comprises:
determining that a number of the one or more regions in the list satisfies a first threshold; or
determining that a total of the one or more regions in the list satisfies a second threshold.

11. The method of claim 10, wherein the second frame of display update data comprises display update data for only the one or more regions in the list.

12. A display device comprising:
a source configured to:
generate an overlay of display update data, wherein the overlay of display update data indicates a plurality of pixels as transparent, and
compress the overlay of display update data; and
a processing system coupled to the source and comprising:
a display memory configured to store a first frame of display update data received from the source; and
a display driver module configured to operate in a partial self-refresh mode comprising:
receiving the compressed overlay of display update data from the source;
decompressing the overlay of compressed display update data;
merging the decompressed overlay of display update data with the stored first frame of display update data to form a merged image; and
updating the display using the merged image, wherein updating the display using the merged image comprises, for each pixel in the display, updating the pixel using the stored first frame of display update data based on an indication that the corresponding pixel in the overlay of display update data is one of the transparent pixels and updating the pixel using the overlay of display update data directly based on an indication that the corresponding pixel in the overlay of display update data is not transparent, without storing the merged image in the display memory;
wherein the source is further configured to:
determine that a plurality of regions of the display has been changed, and
responsive to the determination, send a second frame of display update data to the display memory; and;
wherein the display memory is further configured to replace at least a portion of the stored first frame of display update data with the second frame of display update data.

13. The display device of claim 12, wherein the overlay of display update data is generated based on a determination that a region of the display has been changed, wherein the overlay of display update data indicates a first plurality of pixels corresponding to the region of the display that has been changed as not transparent and a second plurality of pixels corresponding to the region of the display that has not been changed as the plurality of transparent pixels.

14. The display device of claim 12, wherein the source is configured to provide an indication to the display driver module to store the first frame of display update data in the display memory.

15. The display device of claim 12, wherein merging the overlay of display update data with the stored first frame of display update data further comprises:
- reading the overlay of display update data from a frame buffer of the source; and
- while reading the overlay of display update data, reading the stored first frame of display update data from the display memory to form the merged image.

16. A display device comprising:
- a source configured to:
  - generate an overlay of display update data, wherein the overlay of display update data indicates a plurality of pixels as transparent;
  - compress the overlay of display update data;
  - mark one or more regions of the display as being changed based on the generated overlay of display update data; and
  - responsive to determining a threshold amount of regions of the display has been changed, provide a second frame of display update data; and
- a processing system coupled to the source and comprising:
- a display memory configured to store a first frame of display update data received from the source;
- a display driver module configured to operate in a partial self-refresh mode comprising:
  - receiving the compressed overlay of display update data;
  - decompressing the overlay of compressed display update data;
  - merging the decompressed overlay of display update data with the stored first frame of display update data to form a merged image; and
  - updating the display using the merged image, wherein updating the display using the merged image comprises, for each pixel in the display, updating the pixel using the stored first frame of display update data based on an indication that a corresponding pixel in the overlay of display update data is one of the transparent pixels and updating the pixel using the overlay of display update data directly based on an indication that the corresponding pixel in the overlay of display update data is not transparent, without storing the merged image in the display memory; and
- wherein the display memory is further configured to replace at least a portion of the stored first frame of display update data with the second frame of display update data, responsive to the source determining a plurality of regions of the display has been changed.

* * * * *

UNITED STATES PATENT AND TRADEMARK OFFICE
CERTIFICATE OF CORRECTION

| | | |
|---|---|---|
| PATENT NO. | : 10,074,203 B2 | Page 1 of 1 |
| APPLICATION NO. | : 14/581704 | |
| DATED | : September 11, 2018 | |
| INVENTOR(S) | : Stephen L. Morein | |

It is certified that error appears in the above-identified patent and that said Letters Patent is hereby corrected as shown below:

In the Claims

In Claim 7, On Column 9, Line 39, delete "date" and insert -- data --, therefor.

Signed and Sealed this
Twenty-eighth Day of April, 2020

Andrei Iancu
*Director of the United States Patent and Trademark Office*